United States Patent [19]
Nielsen et al.

[11] 4,293,218
[45] Oct. 6, 1981

[54] REFERENCE LIGHT BEAM PROJECTOR

[75] Inventors: Edward G. Nielsen; Kenneth C. Mosley; Louis M. Chatterson, all of Grand Rapids, Mich.

[73] Assignee: Laser Alignment, Inc., Grand Rapids, Mich.

[21] Appl. No.: 974,019

[22] Filed: Dec. 28, 1978

[51] Int. Cl.³ .................. G01B 11/26; G02B 27/17
[52] U.S. Cl. .................. 356/138; 350/6.2; 356/153
[58] Field of Search ........ 356/138, 153, 398, 386–387; 350/6.2, 6.3, 6.4; 250/224

[56] References Cited
U.S. PATENT DOCUMENTS

| | | | |
|---|---|---|---|
| 3,771,876 | 11/1973 | Ljungdahl et al. | 356/153 |
| 3,776,995 | 12/1973 | Little, Jr. | 350/6.2 |
| 3,856,409 | 12/1974 | Cindrich et al. | 356/138 |
| 3,902,810 | 9/1975 | Hamar | 356/138 |
| 3,966,328 | 6/1976 | Wiklund | 356/138 |
| 4,007,992 | 2/1977 | Petrohilos et al. | 356/387 |

FOREIGN PATENT DOCUMENTS

| | | | |
|---|---|---|---|
| 729935 | 8/1932 | France | 356/138 |
| 7366 | of 1911 | United Kingdom | 356/138 |

*Primary Examiner*—William H. Punter
*Attorney, Agent, or Firm*—Price, Heneveld, Huizenga & Cooper

[57] ABSTRACT

A reference light beam projector of the type which produces a modulated plane of light for use as a reference in many different applications such as for aligning railroad tracks. This modulated reference plane is formed by projecting a collimated light beam along a predetermined path and providing means for variably refracting the beam so to effectively variably bend the beam back and forth along a plane. Specifically, the means for variably refracting the beam is a rotating optical element comprising a window through which the beam is transmitted and variably refracted as the optical element is rotated.

16 Claims, 9 Drawing Figures

REFERENCE LIGHT BEAM PROJECTOR

BACKGROUND OF THE INVENTION

Light beams of high intensity such as laser beams are used for producing a reference line or plane which can be used for aligning purposes. One such use is in the aligning of tracks such as is disclosed in U.S. Pat. Nos. 3,706,284, Plasser et al., issued Dec. 19, 1972, and entitled TRACK WORKING APPARATUS WITH LASER BEAM REFERENCE, and 3,750,299, Plasser et al., issued Aug. 7, 1973, and entitled TRACK APPARATUS WITH LASER BEAM REFERENCE.

Prior art projectors used for aligning purposes have generated planes of light for use as references in several different ways. One apparatus of this type produces a fan by means of a fan lens. In other words, optics is used for the purpose of spreading out the light projected by a laser. Such fans of light created by fan lens also require for use in sunlight conditions the modulation of the projected light which is generally accomplished electronically so as to constantly decrease and increase the intensity to provide the modulation.

Another type of apparatus used is to physically reciprocate the projector so that the light beam is reciprocated from one position to another along the reference plane which thereby presents to the detector a modulated signal as the light reciprocates from one position to the next along the reference plane and over the sensor located on the plane. Such apparatus is disclosed in U.S. Pat. No. 3,823,313, Unema, issued July 9, 1974, and entitled LASER FANNING DEVICE.

Another type of apparatus used for producing a plane of light which has the effect of a modulating light source is to project the light beam against an optical element such as a mirror or pentaprism which is rotated and directs the light beam at a 90° angle to the direction of its original projection. This creates a beam of light that is rotating like a beacon and which has the effect of creating a plane of light which when passed over a sensor gives to the sensor the effect of a modulated signal. This type of apparatus is disclosed in U.S. Pat. No. 3,936,197, Aldrink et al., issued Feb. 3, 1976, and entitled SELF-LEVELING LASER ASSEMBLY.

All of the above described prior art apparatus for generating a modulated plane of light have many limitations, particularly when used to project the reference plane at long distances such as between 1000 and 2000 feet. The apparatus using fan lens and light intensity modulation produces a signal at long distances which is very difficult to detect because of the low intensity. Therefore, sophisticated sensors are required at long distances and in many cases sufficiently sensitive sensors have not been developed which will sense the projected light and not be affected by the sunlight. Further, such apparatus requires complicated fan lenses and means for modulating the intensity of the light source.

The apparatus for reciprocally moving the projector has the disadvantage in that external moving parts are required that eventually wear out and must be replaced. Further, in the use of external moving parts, it is very difficult with the use of such parts to obtain the accuracy required for many uses. In addition, there are vibration and inertia problems in the moving of the entire projector. Also, it is desirable that the projector be reciprocated an extremely small distance in order to avoid the excessive spreading out of the light at the location of the sensor which in many instances may be over 1000 feet from the projector. In spreading the light through such a long distance along the plane, the light intensity is reduced significantly so as to present the same problem as described above in relation to the low intensity of the fan lens type apparatus. Actually moving the projector also presents problems and significant errors created by any play in the parts such as the bearings supporting the projector.

With the rotating beam type of apparatus as above described, many of the same problems and disadvantages as described above are encountered. Foremost among these is the light intensity problem and the problems encountered in the mechanism to mount and rotate the mirrors or pentaprisms.

All of the above apparatus is complicated and cumbersome for many intended uses.

SUMMARY OF THE INVENTION

The projector of the present invention is a very simple mechanism which generates a plane of modulated light with a sensed intensity several orders of magnitude greater than the prior art apparatus referred to above. This is all accomplished in a relatively small package with no external moving parts so as to eliminate the problems created thereby in the prior art apparatus. Further, the apparatus of the present invention is significantly more accurate. It is constructed of a minimum number of parts which have little possibility of creating any wear, inertia, or vibration problems. In addition, in accordance with our invention there is no requirement for complicated optical and modulation systems.

The present invention utilizes the same conventional laser tube and lens system which has been used in the past for projecting a straight laser beam. By the simple addition of one assembly within substantially the same housing as has been used in the past for projecting a straight laser beam, a conversion of a straight laser beam projection to a modulated plane of light is accomplished.

In accordance with our invention, this conversion of a straight laser beam projection is accomplished by adding to the optical system a means for variably refracting the light beam. Preferably, such means is a rotating window consisting of an optical glass through which the laser beam is projected. As the window is rotated, the angle at which the beam strikes the flat surfaces thereof varies to produce a variable refracted light beam. This variable refracted light beam thus causes the beam to move along a given plane from one position to another to create a modulated plane of light as a reference plane. All of this apparatus is contained in substantially the same package as the straight beam projector.

The present invention as produced is very small and has a minimum of parts so as to eliminate the problems of the prior art as discussed above. At the same time, the intensity of the signal at the sensor is of substantially greater magnitude than ever imagined with prior art apparatus.

The many objects, advantages, and other aspects of this invention will be readily understood by those who are skilled in the art by reading the following specification with reference to the accompanying drawings.

Figure 1:
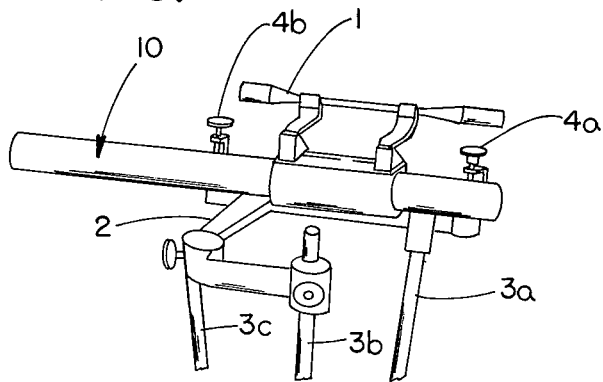
FIG. 1 is a perspective view of the projector of the present invention mounted on a tripod and set up for use in conjunction with a scope.

Referring now to the drawings, and in particular to FIG. 1, the light beam projector of this invention is generally designated by the reference numeral 10. It is shown in FIG. 1 used in conjunction with a scope 1, both of which are mounted on a frame 2 of a tripod that consists of the three legs 3a, 3b, and 3c. The scope 1 and projector 10 are both rigidly mounted on the frame 2 so as to have a predetermined relationship with one another. As is well known in the art, the scope 1 provides a sighting means for aiming the projector 10 so that the beam projected by the projector 10 is projected in a predetermined direction whereby the plane of light generated by the projector 10 provides a reference plane in a desired direction for purposes of aligning objects such as railroad track and the like. Associated with the tripod and the projector and scope is a leveling assembly not specifically disclosed but represented by the adjusting screws 4a and 4b. Leveling assemblies of this type are so well known that it is not considered necessary to specifically disclose the same.

Figure 2:
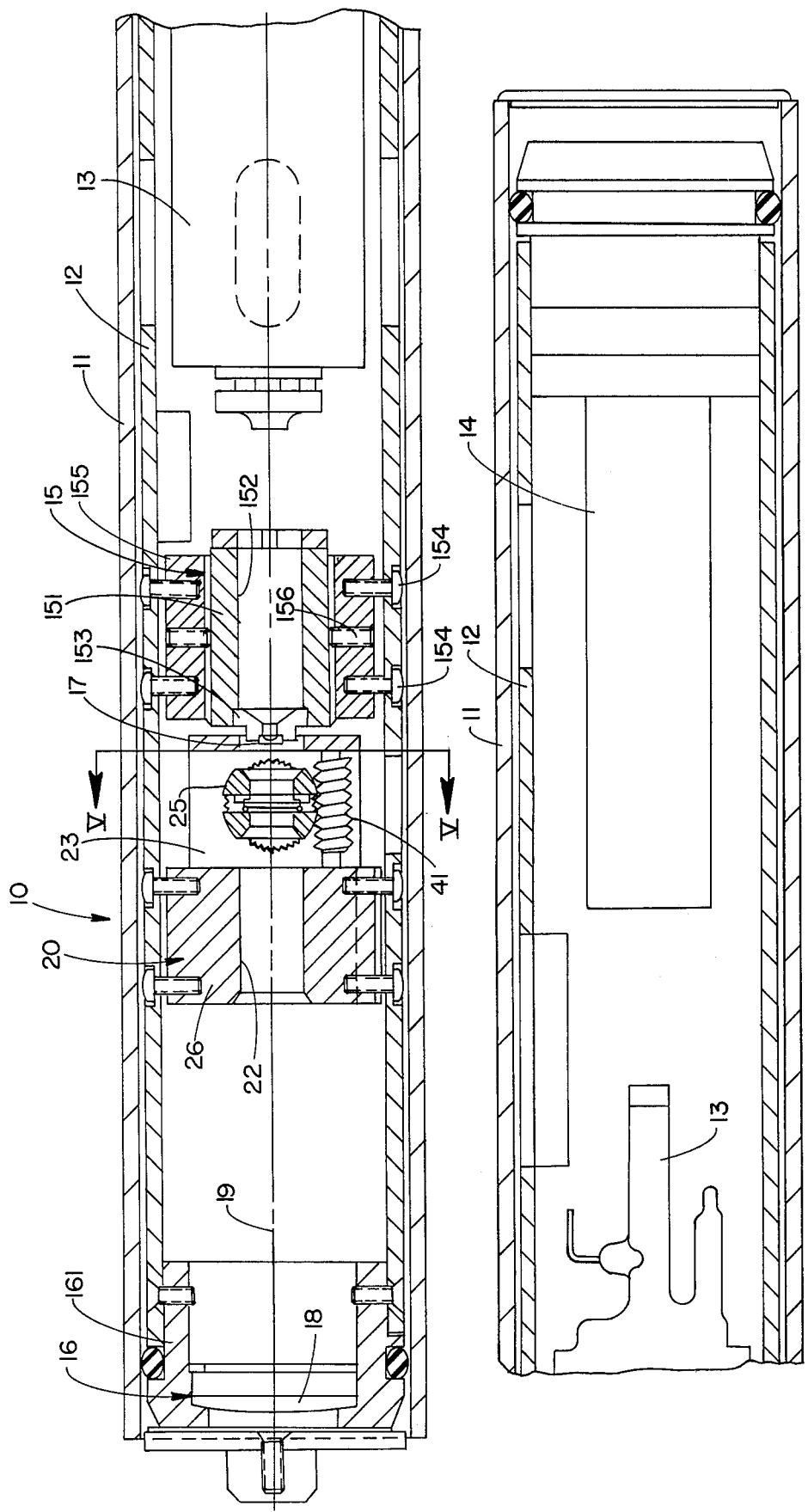
FIG. 2 is a side-elevational cross-sectional view of the projector of this invention shown in two cutaway portions thereof.

The projector 10 is shown in FIG. 2 and comprises a tubular construction which includes an outer casing or tube 11 in which is mounted the inner tube or casing 12. This inner casing or tube 12 is mounted inside the outer casing 11 by conventional means so that the unit is preferably water and air tight.

The inner tube or casing 12 contains the entire components of the projector of the present invention including a light source generator or laser tube 13, the power supply or pack 14 for the laser tube, an inner lens subassembly 15, the front lens subassembly 16, and the rotating window subassembly 20.

The laser tube 13, inner lens subassembly 15, and the front lens subassembly 16 are substantially conventional components normally included in laser beam projector apparatus of this type for projecting a steady beam of light along a given path for various purposes, such as laying underground pipe. In accordance with this invention, we add to these conventional components the rotating window assembly 20 which in this embodiment disclosed is located between the inner lens 17 which is an expanding lens and the front lens 18 which is a collimating lens.

Figure 3:
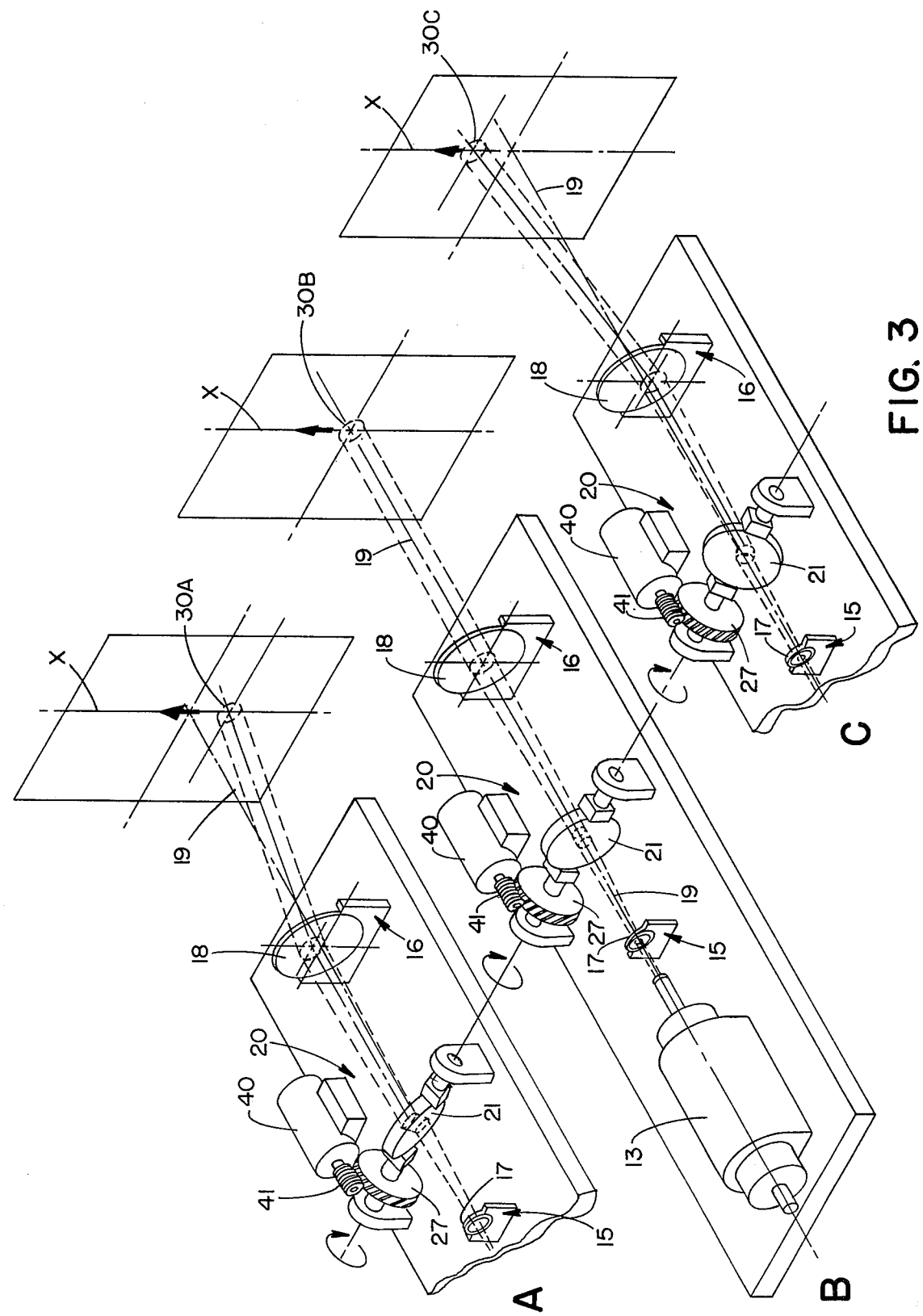
FIG. 3 is a schematic diagram of the major components of the projector of this invention showing three different positions of the rotating optical element so as to illustrate how the beam is bent and reciprocates from a lower to an upper projected position.
Figure 4:
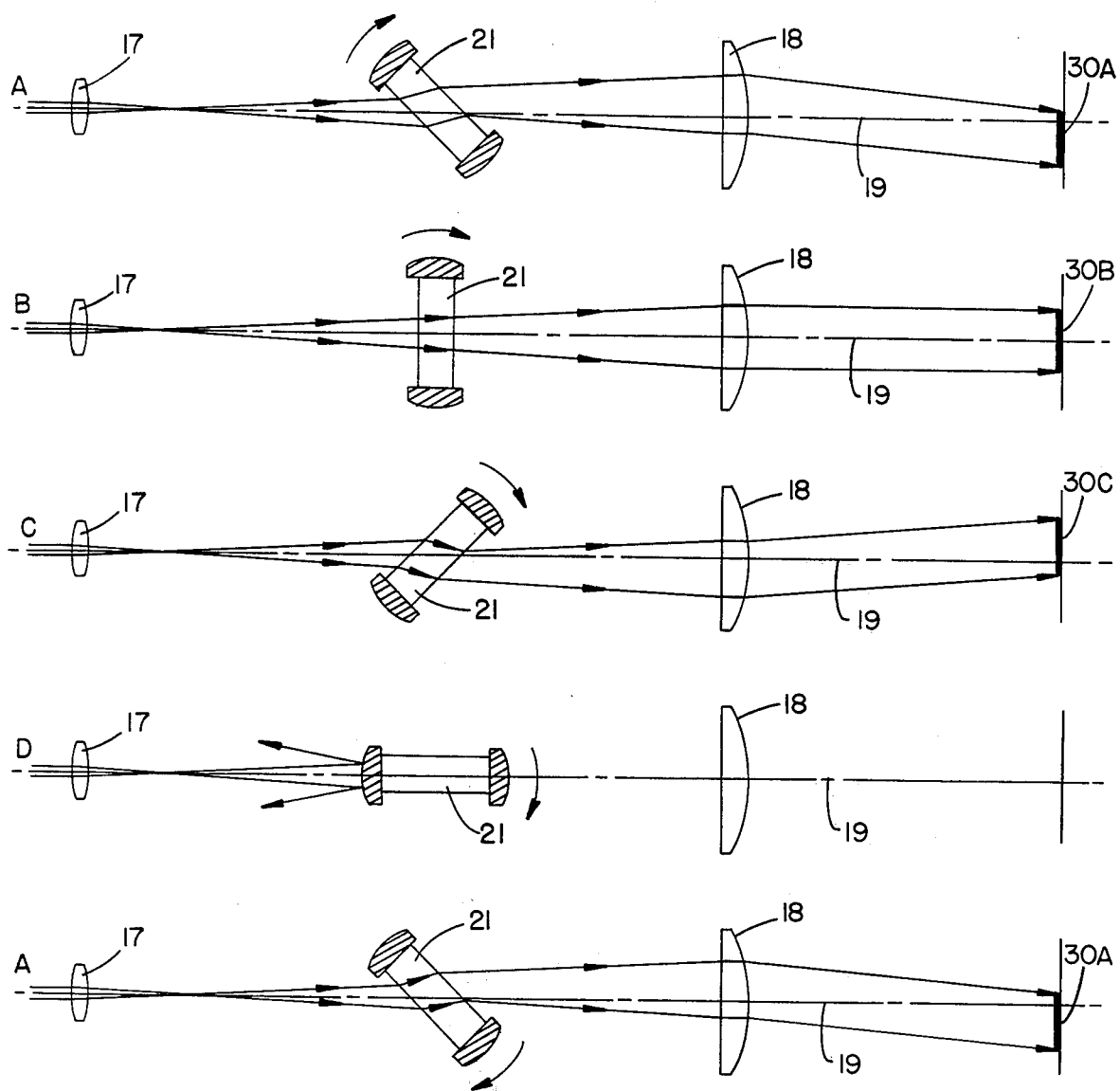
FIG. 4 is also a schematic diagram showing several different positions of the rotating optical element and illustrating how the beam is bent and projected for each of those positions.

Before describing the specific structure of all the components of this invention, it is believed desirable to describe the principle of operation as is best illustrated in FIGS. 3 and 4. FIG. 3 discloses three different illustrations A, B and C, which schematically include the basic components of this invention, i.e., the laser tube 13, the inner lens subassembly 15, the front lens subassembly 16, and the rotating window subassembly 20. The inner lens subassembly includes an inner lens 17 of the expanding type, and the front lens subassembly 16 which includes a front collimating lens 18. The rotating window subassembly 20 includes an optical element or window 21 which preferably is optical glass with flat surfaces. It is rotatably mounted, as will be described hereinafter, and is driven by gears 27 and 41 which in turn are driven by the motor 40. The optical element 21 is arranged to intercept the center ray 19 of the beam projected by the laser tube 13. It is rotated about an axis extending parallel to its two flat surfaces.

The rotational movement of the optical element or glass 21 is illustrated by FIG. 4 which discloses several different rotatable positions of the optical element or window 21.

FIG. 3 shows three different schematics, "A". "B". and "C", which are different in disclosing different positions of the optical element or window 21. These three different positions are also disclosed in FIG. 4 as represented by the schematics "A" "B", and "C". The position of the window 21 in the "A" schematics of FIGS. 3 and 4 is a position tipped toward the light source. The "B" schematics in both figures show the window in an upright position with its flat surfaces perpendicular to the center ray of the beam. Schematics "C" show the window tipped away from the light source. In FIG. 4, schematic "D" discloses the flat faces of the window parallel to the beam with the frame that holds the window blocking out the beam.

It will be evident from the sketches as shown in FIGS. 3 and 4 that this invention uses the refractive characteristics of the window or optical element 21 to variably bend the beam so that it will move along a plane X as disclosed in FIG. 3. Specifically, it will be noted in the schematics "A" that when the window 21 is in a position tipped toward the light source, the refraction of the light rays by the window 21 and the collimation by lens 18 causes the beam to bend downwardly to produce a spot 30a of light below the normal centerline of the beam being projected from the laser tube. In the scematics "B", since the window is in an upright position with its flat surfaces perpendicular to the centerline of the beam, the beam projected by the entire system is positioned on this centerline. However, when the window 21 is in the position tipped away from the light source, the opposite refraction of the light rays causes the beam to bend upwardly and project a light spot above the centerline. In other words, during the rotation of the window 21, the variable refraction of the beam causes it to variably bend and progressively produce light spots at positions 30a, 30b, and 30c, which is repeated for each half revolution. Although normally such a repetition would not be considered a reciprocating action, in this description the term "reciprocation" or "reciprocating" is used to include the same since many different movements such as oscillation of the window which would produce a true reciprocation of the light beam could be used as well as rotation to produce the constant changing of the linear displacement of the position of the light beam. Thus, as the window 21 is rotated, the beam reciprocates between positions 30a and 30c to produce a plane of light which is modulated when sensed at any one position along the plane.

Figure 9:
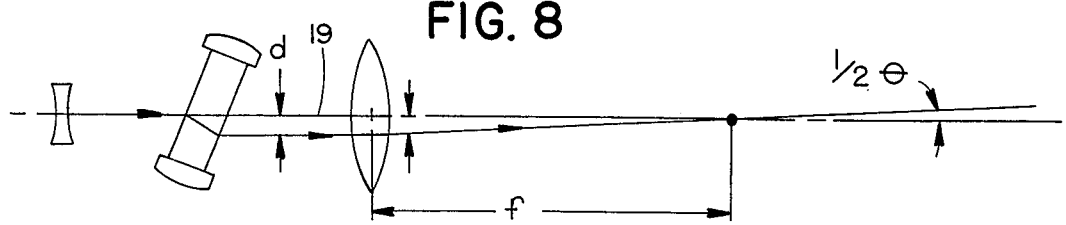
FIG. 9 is a schematic illustration of the system to demonstrate and describe the spread of the light plane.

The spread of the plane of light generated by this invention can be varied as determined by the following formula used in conjunction with the schematic diagram of FIG. 9.

$$\tfrac{1}{2}\theta = \arc \tan d/f$$

In this formula, $\theta$ is the angle of spread, f is the focal length of the front lens, and d is the amount of refraction determined by well known formulas which consider the index of refraction and the thickness and the angle of rotation of the window 21. In other words, the angle $\theta$ of spread can be increased by shortening the focal length and thickening the flat rotating glass.

Having described the principle of the present invention, reference is made again to FIG. 2 which discloses the details of the components. As previously stated, the laser tube 13 is a conventional tube used for generating laser beams for use in the construction industry. The inner lens subassembly 15 is also substantially conventional. It includes an elongated body 151 having an opening 152 extending therethrough and at the forward end a holder 153 for supporting the lens 17 which can either be a negative or positive lens. An example of an expanding lens that can be used is a negative lens having a focal length of minus 8 mm. The cylindrical body 151 is mounted inside another cylindrical body 155 and is secured therein by a set screw 156. The cylindrical body 155 is secured to the inner tube 12 by a plurality of bolts 154 spaced around the circumference of the tube 12.

The front lens subassembly 16 includes a collimating lens 18 supported in an end cap 161 by any well known means. An example of a collimating lens that can be used is in conjunction with the example of the inner lens as above given in an achromatic lens having a focal length of 132 mm.

The rotating window subassembly is disclosed in greater detail by FIGS. 5, 6, 7, and 8. This subassembly 20 includes a substantially cylindrically-shaped body portion 26 at the forward end through which is provided an opening 22. Extending from the rearward end are two arms 23 and 24 providing a space therebetween for supporting the window subassembly 25.

Figure 7:
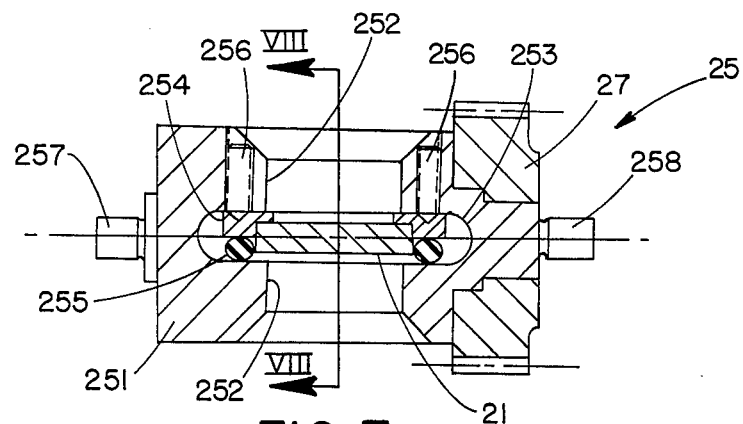
FIG. 7 is a cross-sectional view of the window subassembly showing how the glass is mounted therein.
Figure 8:
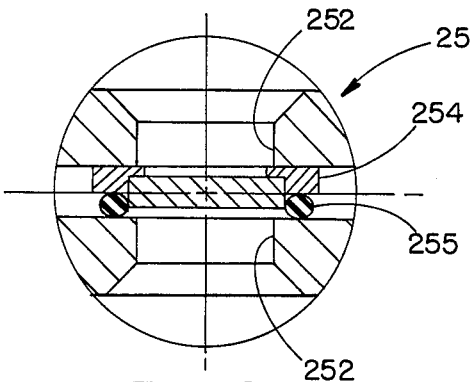
FIG. 8 is a cross-sectional view taken along the plane VIII—VIII of FIG. 7.
Figure 5:
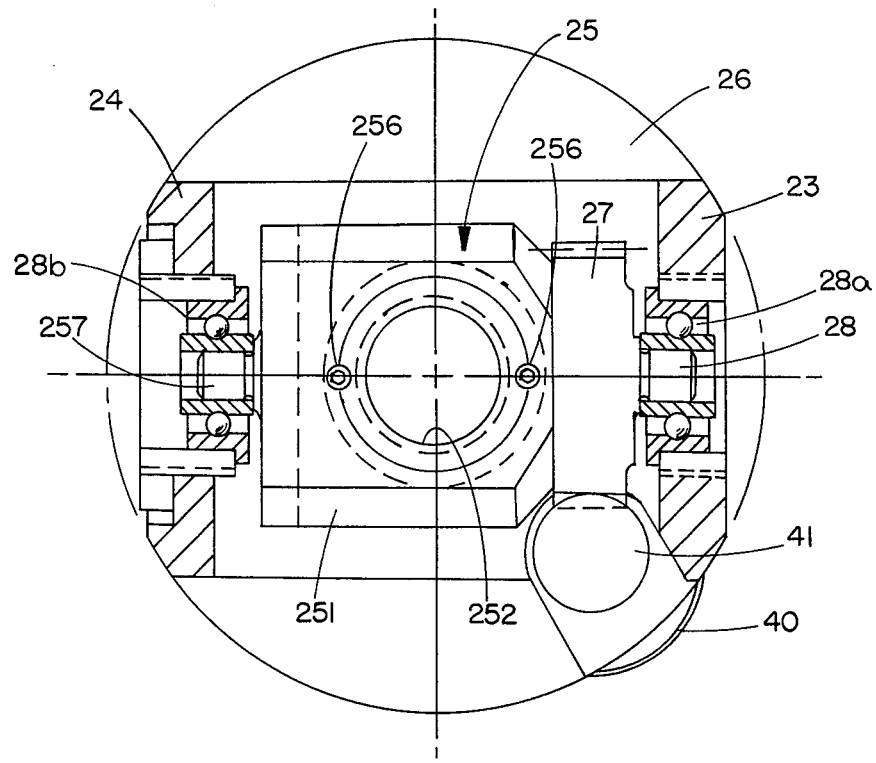
FIG. 5 is a cross-sectional view of the rotating window assembly taken along the plane V—V of FIG. 2, showing the bearing structure in cross section.
Figure 6:
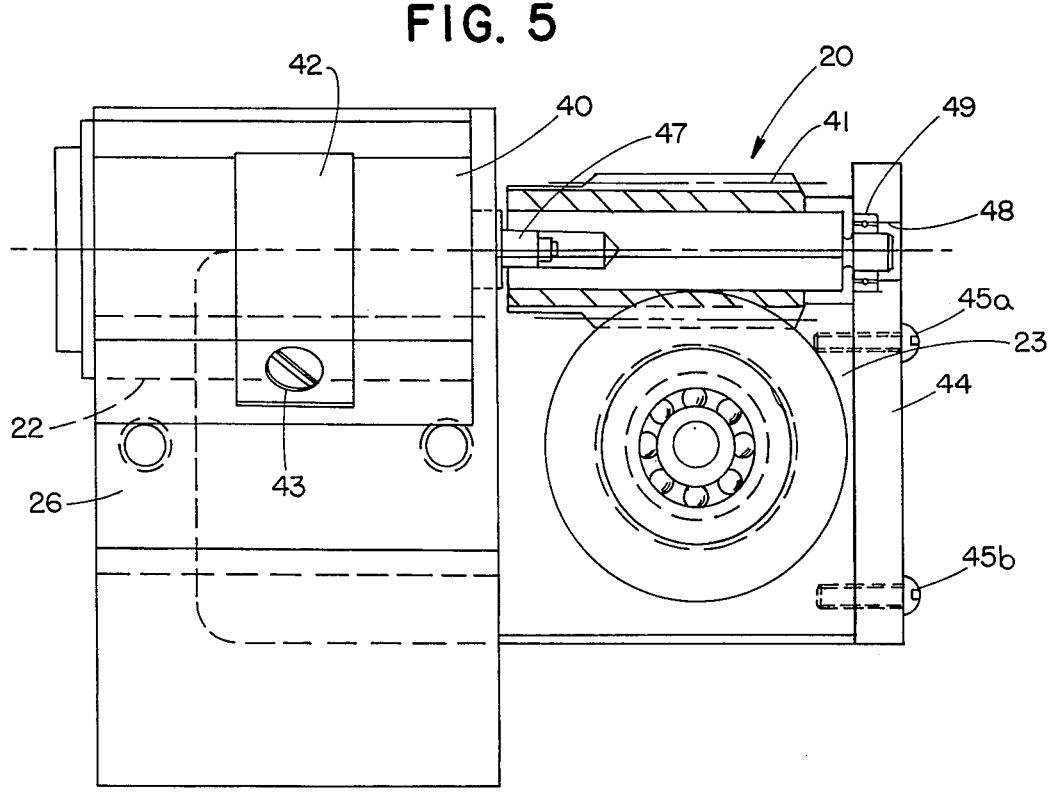
FIG. 6 shows another elevational view of the rotating window assembly illustrating how the motor and worm gear subassembly is mounted on the support blocks.

This window subassembly 25 as disclosed in FIGS. 5 and 7 comprises a rectangular housing 251 having an opening 252 extending therethrough for transmitting the laser beam therethrough. Mounted in this opening or aperture 252 is an optical element or so-called window 21. The window is approximately 0.084 inches thick and is an optical glass with flat surfaces. It has an index of refraction of approximately 1.52. The window is supported in the body 251 by means of a slot 253 in the body 251. The window 21 is retained in this slot by means of a collar 254, the O-ring 255, and the set screws 256. This permits the window to be adjusted and properly positioned with respect to the laser beam projected therethrough.

Extending from each side of the support body 251 are the axles 257 and 258. Secured onto the axle 258 is the helical gear 27 which is provided, as will be described, to drive and rotate the window subassembly.

The window subassembly is rotatably mounted between the two arms 23 and 24 by means of the shafts or axles 257 and 258 journaled within openings in the two arms 23 and 24, respectively. For that purpose, ball bearing assemblies 28a and 28b are provided. As previously stated, the helical gear 27 drives and rotates the window assembly 25. This is done as disclosed in FIG. 6 through a very small motor 40 and a worm gear 41 engaging the helical gear 27. The motor 40 is mounted in a recess provided in the body portion 26 by a strap 42 and screws, one being shown and designated by the reference numeral 43. The worm gear is mounted between an end plate 44 secured to the arms 23 and 24 by the screws 45a and 45b. Worm gear 41 extends between the end plate 44 and the end body portion 26. It is attached to the shaft 47 of the motor 40 and is journaled in an opening 48 of the end plate 44 by the ball bearing assembly 49.

It is evident from the above description that the rotating window subassembly 20 is a very small package. For example, it is less than 2 inches in diameter and constructed of a minimum number of parts all of which have the minimum possibilities of wearing out. The motor is a very small motor and all the moving parts are very small so that there is no vibration, wear, or inertia problems. It provides a very nice package that can be easily mounted between the inner and front lens of the assembly.

OPERATION

Having described the principle of the invention and also the specific details of the construction, the operation of the projector of this invention should be quite evident.

Having connected both the laser tube 13 and the motor 40 to a suitable source of power provided by any well known means by the power pack 14, the laser tube will project a beam along the centerline 19 through the opening 152 of the inner lens holder subassembly and then through the inner lens 17. The lens 17 expands the beam of light as determined by its focal length causing the rays to strike and pass through the optical element or window 21. Window 21 is rotating at an approximate speed of 6 revolutions per second, although other speeds could be used depending upon the sensor utilized with the system. As the light rays pass through the window 21, they are refracted (FIGS. 3 and 4) and then collimated by the front lens 18. This causes a collimated beam to be projected along a plane but to progressively bend in directions depending upon the rotatable position of the window. In other words, the beam is progressively bent different degrees depending upon the rotational position of the window and other factors, as discussed above. As the window rotates, because of the bending of the beams, the position of the beam along a plane changes, thus creating a plane of light that for any one point on the plane is seen as a modulating light. The modulation produced by the apparatus comprises 2 pulses for each revolution of the window. Thus, for example, if the window is rotating at 6 revolutions per second, there are 12 pulses per second created by the rotating window.

In use, the projector is set up for generating this modulated plane of light and a sensor is provided for detecting the same. It should be understood that the projector of this invention can be utilized for generating a modulated plane of light in any direction (vertical, horizontal, or at an angle from the vertical or horizontal) without adversely affecting its operation.

Having thus described our invention, those skilled in the art will immediately appreciate the many advantages of this projector. The invention provides a new and useful laser projector assembly which does not suffer from the drawbacks of prior art projector system for generating a modulated plane of light. Although we have described a preferred embodiment, it should be understood that other embodiments thereof could be adapted using the same inventive concepts of the present invention without departing from its spirit and scope.

The embdiments of the invention in which an exclusive property or privilege is claimed are described as follows.

1. A reference light beam projector for producing a modulated plane of light comprising: a narrow light beam source for projecting a light beam along a predetermined path; an expanding lens located forwardly of said projector on said path, and a collimating lens located forwardly of said expanding lens from said projector on said path, the improvement comprising a variable light refracting means located between said lenses in the path of said beam for variably bending said beam along a plane; and means for actuating said light refracting means to variably bend said beam to poduce a modulated plane of light.

2. The projector of claim 1 in which the variable bending beam is produced by reciprocating said refracting means between two positions to in effect produce a modulated source of light at any one position on said plane.

3. In a reference light beam projector comprising in combination: a casing; a light beam projector in said casing arranged to project a narrow beam of light along a given path, an inner expanding lens mounted in said casing forwardly of said projector and located on said path, and a front collimating lens mounted in said casing and located forwardly of said expanding lens from said projector on said path, the improvement comprising and a variable light refracting means located between said lenses in the path of said beam for variably bending said beam along a plane; and means for actuating said light refracting means to variably bend said beam and produce a modulated plane of light.

4. The projector of claim 3 in which the variable bending beam is produced by reciprocating said refracting means between two positions to in effect produce a modulated source of light at any one position on said plane.

5. In a reference light beam projector comprising in combination: a casing; a light beam projector in said casing arranged to project a narrow beam of light along a given path, an inner expanding lens mounted in said casing immediately adjacent said projector and located on said path, and a front collimating lens mounted in the end of said casing and located on said path, the improvement comprising a transparent window mounted in said casing between said inner and front lenses and in said path with said beam being transmitted therethrough; means for continuously rotating said window element; said window element causing said light beam transmitted therethrough to be refracted different degrees for different rotatable positions thereof whereby the said beam transmitted through said lenses and window element reciprocates from one refractive position to another to produce a modulated plane of light.

6. In a reference light beam projector comprising in combination: a casing; a light beam projector in said casing arranged to project a narrow beam of light along a given path, an inner extending lens mounted in said casing immediately adjacent said projector and located on said path, and a front collimating lens mounted in the end of said casing and located on said path, the improvement comprising an optical element located between said inner and front lenses and in said path with said beam being transmitted therethrough; means for continuously rotating said element; said element being characterized by said beam being bent by refraction as it is transmitted therethrough; the degree of such bending being different for different rotatable positions of said element whereby the said beam transmitted through said optical element moves through a reciprocating bending action as the said optical element is rotated to produce a modulated plane of light.

7. In a reference light beam projector comprising in combination: a casing; a light beam projector in said casing arranged to project a narrow beam of light along a given path, an inner expanding lens mounted in said casing immediately adjacent said projector and located on said path, and a front collimating lens mounted in the end of said casing and located on said path, the improvement comprising an optical element located between said inner and front lenses and located in the path of said beam, said optical element being characterized by said beam being transmitted therethrough and during said transmission said light beam is refracted in at least different rotatable positions of said element, the degree of such refraction being different for different rotatable positions of said optical element whereby as said optical element rotates the refracted beam reciprocates between two positions to produce a modulated plane of light.

8. The projector of claim 5 in which the window is generally a flat transparent element mounted in a frame, said frame being journaled inside said casing for rotation about an axis essentially on the plane of said flat element and having driven means; a motor; and driving means connecting the drive output of said motor to the driven means of said window.

9. The projector of claim 5, 6, 7, or 8 in which the said light beam projector, said inner and front lens, and said rotatable element are located in an inner tube; said inner tube being located within an outer tubular casing to provide a compact shock resistant assembly.

10. The projector of claim 5 or 8 in which the index of refraction of the window is approximately 1.5.

11. In a method of generating a modulated beam of light by projecting a narrow beam of light along a given path first through an expanding lens and then through a collimating lens, the improvement comprising variably refracting said beam of light between said expanding and collimating lenses to cause said beam to variably bend along a plane between two projected positions so as to generate a plane of light which in effect is a modulated light for any one position located on said plane.

12. In a method of generating a modulated beam of light by projecting a narrow beam of light along a given path first through an expanding lens and then through a collimating lens, the improvement comprising the providing of a continuously rotating optical element in the path of said beam between said expanding and collimating lenses which during transmission of said beam therethrough causes refraction of said light beam at different degrees for different rotatable positions of said optical element whereby the refracted beam continuously reciprocates between two positions to produce a modulated plane of light.

13. In a method of generating a modulated beam of light by projecting a narrow collimated beam of light along a given path first through an expanding lens and then through a collimating lens, the improvement comprising the providing of a continuously rotating window element in the path of said beam between said expanding and collimating lenses which during transmission of said beam therethrough causes refraction of said light beam at different degrees for different rotatable positions of said window element whereby the refracted beam continuously reciprocates between two positions to produce a modulated plane of light.

14. In a method of generating a modulated beam of light by projecting a narrow collimated beam of light along a given path first through an expanding lens and then through a collimating lens, the improvement comprising the providing of a continuously rotating optical element in the path of said beam between said expanding and collimating lenses said optical element being characterized by permitting the transmission of a substantial portion of said light therethrough and which during transmission of said beam therethrough causes refraction of said light beam at different degrees for different rotatable positions of said optical element whereby the refracted beam continuously reciprocates between two positions to produce a modulated plane of light.

15. In a method of generating a modulated beam of light by projecting a narrow collimated beam of light along a given path first through an expanding lens and then through a collimating lens, the improvement comprising the providing of a continuously rotating window element in the path of said beam between said expanding and collimating lenses said optical element being characterized by permitting the transmission of a substantial portion of said light therethrough and which during transmission of said beam therethrough causes refraction of said light beam at different degrees for different rotatable positions of said window element whereby the refracted beam continuously reciprocates between two positions to produce a modulated plane of light.

16. The method of claim 12 or 13 in which the index of refraction is about 1.5.

* * * * *

UNITED STATES PATENT AND TRADEMARK OFFICE
CERTIFICATE OF CORRECTION

PATENT NO. : 4,293,218

DATED : October 6, 1981

INVENTOR(S) : Edward G. Nielsen, et al.

It is certified that error appears in the above—identified patent and that said Letters Patent is hereby corrected as shown below:

Col. 3, line 23;
"blocks" should be ---block---;

Col. 4, line 53;
"scematics" should be ---schematics---;

Col. 7, line 7;
"system" should be ---systems---;

Col. 7, line 14;
"embdiments" should be ---embodiments---;

Col. 8, line 4;
"extending" should be ---expanding---.

Signed and Sealed this

Thirtieth Day of March 1982

[SEAL]

Attest:

*Attesting Officer*

GERALD J. MOSSINGHOFF

*Commissioner of Patents and Trademarks*